Sept. 29, 1970  F. X. ZAMMIT  3,531,615
ELECTRICAL DISCHARGE MACHINING WITH STEP DRIVEN ELECTRODE
Filed Sept. 8, 1966  2 Sheets-Sheet 2

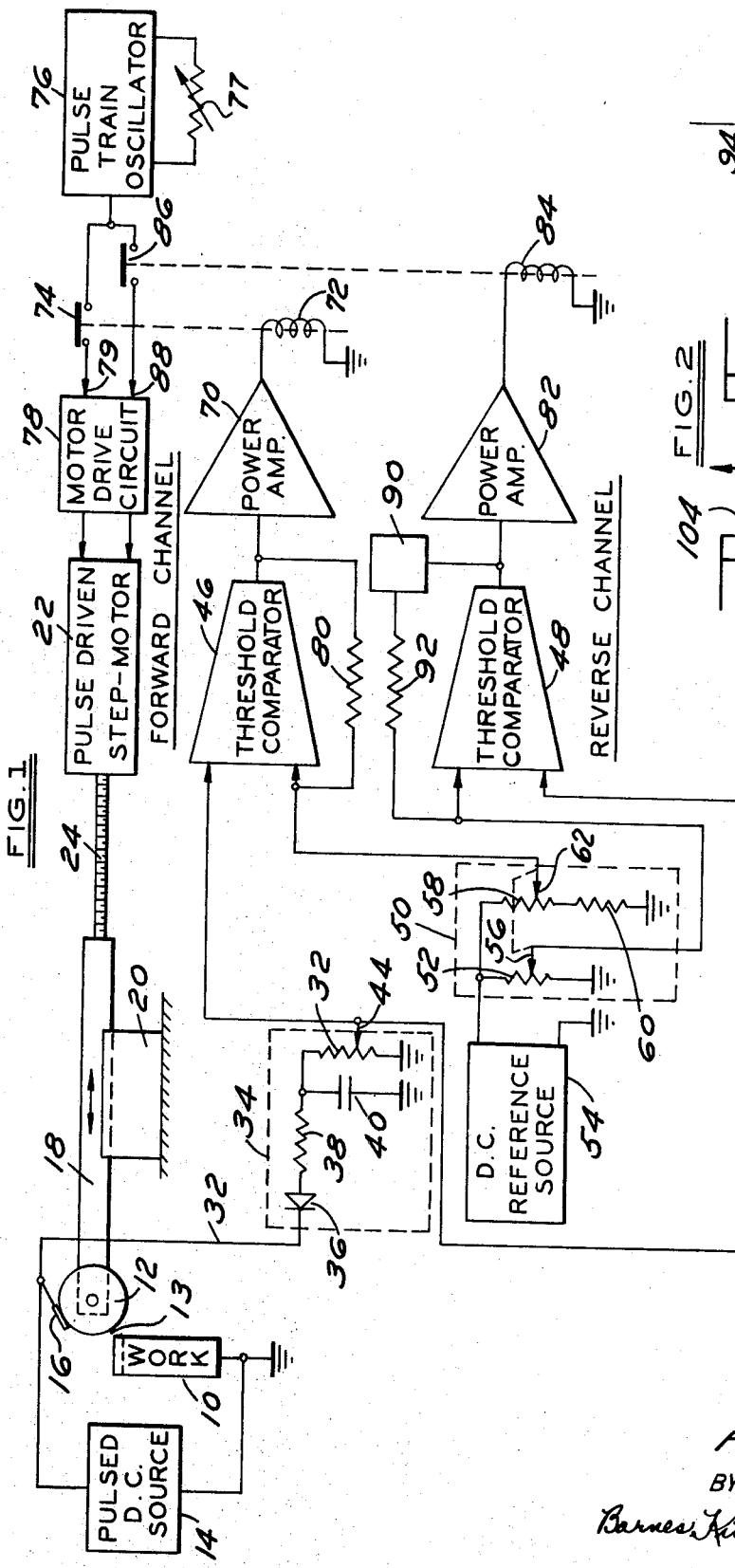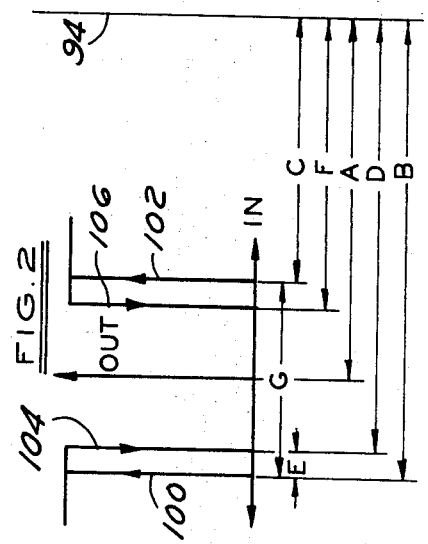

INVENTOR
FRANK X. ZAMMIT
BY
Barnes, Kisselle, Raisch & Choate
ATTORNEYS

United States Patent Office 3,531,615
Patented Sept. 29, 1970

3,531,615
ELECTRICAL DISCHARGE MACHINING WITH
STEP DRIVEN ELECTRODE
Frank X. Zammit, West Bloomfield, Mich., assignor to
F. Joseph Lamb Company, Detroit, Mich., a corporation of Michigan
Filed Sept. 8, 1966, Ser. No. 577,920
Int. Cl. B23p 1/14
U.S. Cl. 219—69            11 Claims

ABSTRACT OF THE DISCLOSURE

Electrical discharge machining apparatus wherein a stepping motor drives the electrode into the workpiece in precise increments at a substantially constant rate during a machining operation. The stepping motor is controlled by an error circuit responsive to variations in the discharge gap outside of predetermined limits to obtain the aforementioned continuous motion of the electrode into the workpiece unless a short occurs at the gap. The repetition rate of the pulse source which drives the motor is selected so that the electrode moves into the workpiece at the fastest possible rate. The gap is held to an optimum gap within predetermined limits by comparing the average gap voltage with two separate references in the error circuit.

---

This invention relates generally to the art of removing material from a workpiece by electrical discharge and more particularly to a method and an apparatus for maintaining a predetermined discharge gap between an electrode and a workpiece during a machining operation.

Certain prior art techniques for maintaining a predetermined gap during an electrical discharge machining operation employ a closed loop servo. Such servos provide continuous control of the relative motion between the electrode and the workpiece in accordance with an error signal derived from the voltage across the gap. In one prior art technique, an electro-hydraulic servo valve is controlled by a difference signal obtained by direct comparison of the gap voltage with a single reference voltage which represents a predetermined optimum gap between the electrode and the workpiece. The polarity of the difference signal determines the direction in which the electrode is moved relative to the workpiece and the magnitude of the difference signal determines the rate at which the electrode is moved. Stated differently, the electrode is moved in a direction and at a rate that is directly proportional to the size or condition of the gap. For example, at open circuit when the electrode is spaced some distance from the workpiece and no discharge occurs across the gap, the feed rate of the electrode is maximum and in a direction to close the gap. As the electrode approaches the workpiece, sparking begins and the gap voltage decreases which in turn reduces the rate at which the electrode is fed toward the workpiece. At short circuit the electrode is fed at a maximum rate away from the workpiece and the rate decreases as the electrode retracts from the workpiece. The feed rate is controlled automatically and not by the operator. One significant disadvantage with a control of this type having reasonably good sensitivity, is that the system has a tendency to hunt and the electrode may start, stop, reverse and stop again, moving in forward and reverse directions about the reference corresponding to a predetermined optimum gap. Any stopping of the electrode during the machining operation reduces the rate at which material is removed. Ideally, the electrode should move continuously in a forward direction and at just the maximum speed at which material is removed at an optimum gap size. Although decreasing the sensitivity of a closed loop servo can reduce hunting by the system, this is only a compromise since the optimum gap will not be maintained accurately during the machining operation and thus the material removal rate is reduced.

The objects of the present invention are to control the discharge gap during a machining operation by a method and an apparatus that remove material at a high rate relative to prior art techniques; that provide operator capability to vary the feed rate and thus allow the operator to determine and set an optimum feed rate for a machining operation; that ideally achieve substantially continuous motion of the electrode in a forward direction relative to the workpiece at a substantially constant rate without any stopping and/or reversing of the electrode relative to the workpiece; that minimize hunting of the system for a predetermined gap without costly closed loop anti-hunting modifications; that have high input sensitivity and high output resolution and thus achieve accurate control of the gap; and that achieve effective, reliable and economical electrical discharge machining.

In accordance with the present invention, the gap is controlled during a machining operation by moving the electrode relative to the workpiece in small, discrete displacement increments and the gap can vary from an optimum size within narrow predetermined limits. The feed rate of the electrode relative to the workpiece and the optimum gap size can both be controlled independently by the operator so that for a given machining operation, the electrode moves continuously forward in precise increments at a constant rate that achieves optimum material removal. The permitted variation of the gap provides a dead band so that if the gap is within the dead band, relative motion between the electrode and the workpiece stops. When the gap is greater than the maximum limit of the dead band or less than the minimum limit of the dead band, the electrode is moved relative to the workpiece to bring the gap back toward the dead band. With this arrangement, an operator can set the ideal feed rate for the electrode so that it moves forward without stopping except when a chip shorts a gap. Stated differently, the electrode is fed at the fastest possible rate corresponding to the rate at which material is removed from the workpiece which machining at the optimum discharge gap. Overshoot, hunting, stopping and starting by the control system are minimized or eliminated completely during normal operation. However, if the electrode is fed at too fast a rate, the electrode will stop momentarily when the gap closes to within the dead band but since the electrode moves in small increments, the electrode will not overshoot the dead band. By utilizing the dead band control, high input sensitivity and high output resolution can be retained without substantially impairing the accuracy of the control or causing hunting by the control. In the preferred embodiment of the present invention, a pulse driven step-motor is used to move the electrode in discrete displacement increments. In general, the motor is controlled in response to a comparison of the average gap voltage with two reference signals which correspond respectively to the maximum limit and the minimum limit of the dead band.

Other objects, features and advantages of the present invention will become apparent from the following specification, the appended claims and the accompanying drawings in which:

FIG. 1 is a circuit diagram, partly in block form, of an electrical discharge machining control apparatus of the present invention;

FIG. 2 illustrates a transfer function useful in explaining the operation of the apparatus illustrated in FIG. 1;

Figure 4:
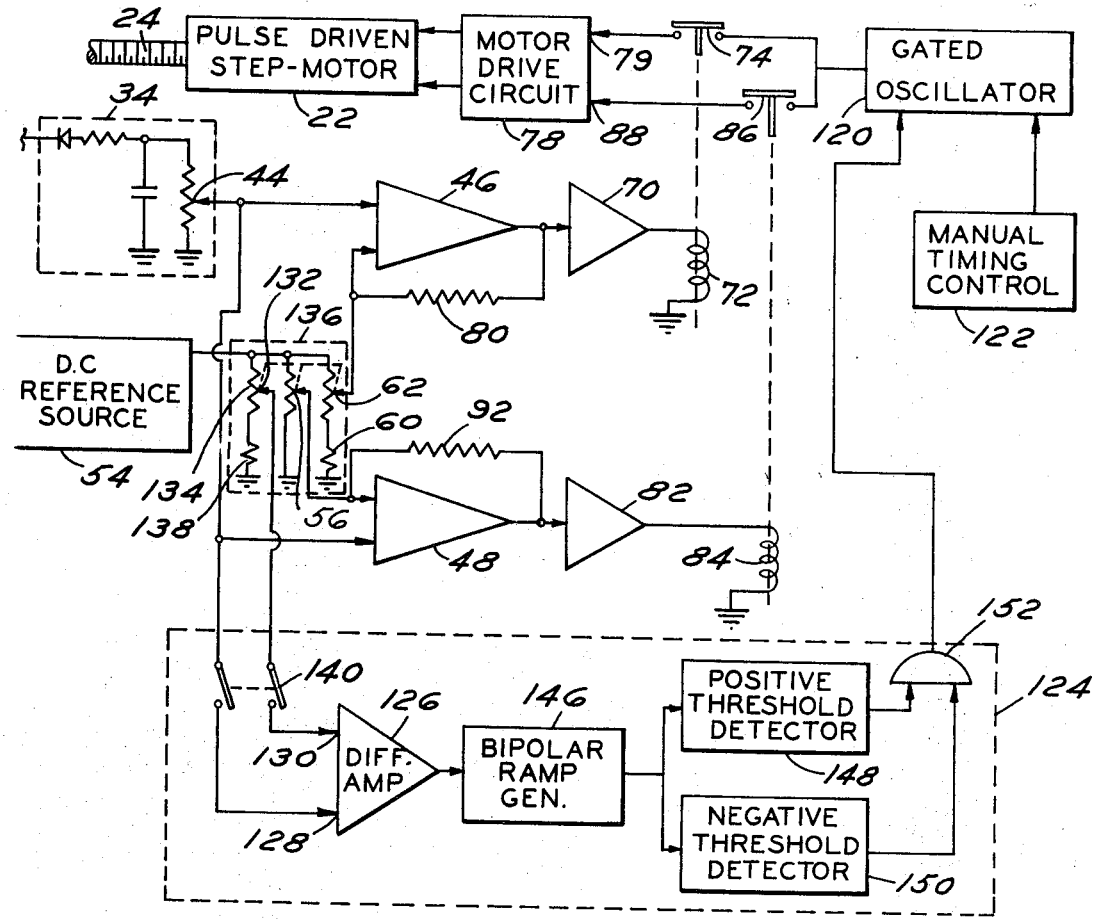
FIG. 4 illustrates still a further modification for the circuit of FIG. 1 to provide a quasi-proportional control.

For purposes of illustration and not by way of limitation, FIG. 1 shows a workpiece 10 that is to be machined with an electrode 12 by electrical discharge occurring across a gap defined generally between electrode 12 and workpiece 10 and designated at 13. Electrode 12 is in the form of a wheel in the preferred embodiment although other electrode configurations can be used. Power for electrical discharge machining is provided by a pulsed direct current source 14 that is connected to the wheel electrode 12 by a brush 16 and to the workpiece 10 which is grounded. The wheel electrode 12 is rotatably mounted on a carriage 18 which in turn is slideably mounted on a machine bed 20 for movement in opposite horizontal directions as viewed in FIG. 1. Electrode 12 is rotatably driven by conventional means (not shown). In accordance with one important aspect of the present invention, carriage 18 is driven by a pulse driven step-motor 22 connected to carriage 18 by a precision lead screw 24. Screw 24 is threadably connected to carriage 18 by suitable means such as a precision nut (not shown). In accordance with another important aspect of the present invention, motor 22 is controlled so that screw 24 is driven in discrete rotational increments to in turn move carriage 18 and electrode 12 in discrete displacement increments and in either a forward direction (from right to left as viewed in FIG. 1) or a reverse direction (from left to right) during a machining operation to maintain gap 13 within predetermined limits at which material is removed from workpiece 10 at the fastest possible rate.

The wheel electrode 12 is electrically connected via a conductor 32 to a gap sensing circuit 34 which develops an output in accordance with variations of the average voltage across gap 13. The output of circuit 34 represents the condition of gap 13 and more particularly varies in accordance with the size of the gap or the spacing between the electrode 12 and workpiece 10. The gap sensing circuit 34 is generally conventional and comprises a rectifier 36, a series resistor 38, and a storage or integrating capacitor 40. A potentiometer 32 connected in shunt with capacitor 40 has a wiper 44 by means of which the output level from the circuit 34 can be adjusted. The output at wiper 44 is fed to a pair of threshold comparators 46, 48 together with respective reference signals from a reference circuit 50. Reference circuit 50 includes a first potentiometer 52 connected across a direct current reference source 54. Potentiometer 52 has a wiper 56 at which the reference signal for comparator 48 is developed. A second potentiometer 58 is connected in series with a fixed resistor 60 across source 54 and has a wiper 62 at which the reference signal for comparator 46 is developed. In the preferred embodiment, wipers 56, 62 are ganged together so that the potentiometers 52, 58 can be adjusted simultaneously. Resistor 60 establishes a difference in the reference signals for comparators 46, 48 to determine the width of a dead band for the control, or stated differently, to determine maximum and minimum limits within which the gap 13 can vary without causing motion of electrode 12 as will later be described in greater detail.

Forward motion of electrode 12 is controlled by a forward control channel generally comprising comparator 46, a power amplifier 70, a relay coil 72 having relay contacts 74, a pulse train oscillator 76 and a motor drive circuit 78. In response to the reference signal from circuit 50 and the gap signal from circuit 34 comparator 46 provides an output when gap 13 is greater than the maximum limit of the dead band. The output from comparator 46 is fed to amplifier 70 which in turn energizes coil 72 and closes contacts 74. Closure of contacts 74 connects oscillator 76 to one input 79 of drive circuit 78. In response to an input at 79, circuit 78 pulses motor 22 so that screw 24 rotates incrementally in a direction that moves carriage 18 and electrode 12 incrementally in a forward direction. A resistor 80 connected from the output of comparator 46 to the input from reference circuit 50 provides feedback to minimize noise effects and stabilize the operation of comparator 46.

Reverse motion of electrode 12 is controlled by a reverse control channel generally comprising comparator 48, a power amplifier 82, a relay coil 84 having contacts 86, oscillator 76 and circuit 78. In response to inputs from circuit 50 and circuit 34 comparator 48 provides an output when gap 13 is less than the minimum limit of the dead band and the output is fed to amplifier 82 which energizes relay coil 84. Relay coil 84 in turn operates contacts 86 which connect oscillator 76 to a second input 88 of the motor drive circuit 78. In response to an input at 88, circuit 78 pulses motor 22 so that screw 24 rotates in a direction that retracts carriage 18 and thus electrode 12 from the workpiece 10. Comparator 48 is also provided with feedback through an inverter 90 and a resistor 92 connected to the reference signal input to stabilize operation of the comparator. Oscillator 76 is a free-running oscillator whose frequency can be adjusted by suitable means illustrated as a variable resistor 77. Each pulse applied to circuit 78 from oscillator 76 causes a precise incremental rotation of motor 22 in one direction or the other depending on whether the input is at 79 or 88. Additionally, each incremental displacement or step of motor 22 in response to a pulse from oscillator 78 is substantially constant regardless of the oscillator frequency so that the feed rate of carriage 18 varies as a function of the oscillator frequency selected by the operator.

Electrical discharge machining in accordance with the present invention will be better understood in conjunction with the transfer function illustrated in FIG. 2 wherein the abscissa axis is an input axis and the ordinate axis is an output axis. For purposes of illustration, points along the input axis will be considered as representing input voltage levels in the control circuit (at comparators 46, 48) although it is to be understood that points along the abscissa axis also represent the condition at gap 13. In accordance with conventional practice, electrode 12 is connected to the negative terminal of source 14 and thus the transfer function is illustrated in FIG. 2 to the left of a vertical axis 94 which represents a zero input voltage level. Axis 94 also corresponds to a shorted gap as when electrode 12 touches workpiece 10 or when gap 13 is shorted by a chip. The optimum average gap voltage corresponding to the size of gap 13 at which optimum material removal occurs is designated by a level A. The reference signal output at wiper 62 for comparator 46 is designated by a level B. Comparator 46 is designed with a turn-on threshold to provide an output whenever the gap signal at 44 is greater in magnitude than the reference signal at wiper 62. Thus, the turn-on condition of comparator 46 is designated by a vertical line 100. The level B also corresponds to a predetermined maximum gap size which if exceeded by the gap 13 causes comparator 46 to provide an output and initiate forward travel of electrode 12. The reference signal output at wiper 56 is designated by a level C. Comparator 48 is designed with a turn-on threshold to provide an output when the gap signal from wiper 44 is smaller in magnitude than the reference signal from wiper 56. The turn-on condition of comparator 48 is designated by a vertical line 102. The level C also corresponds to a predetermined minimum gap and if gap 13 is less than the minimum gap comparator 48 initiates retraction of electrode 12.

At the beginning of a machining operation, gap 13 will be substantially greater than the optimum gap and the corresponding average gap voltage at wiper 44 will be greater (in magnitude) than the reference signal (level B) at wiper 62. At this input condition, comparator 46 provides an output to amplifier 70 to close contacts 74 and connect oscillator 76 to the motor drive circuit 78. In response to the pulse train input at 79, circuit 78 pulses motor 22 continuously so that screw 24 rotates incrementally (in steps) and in a direction that moves carriage 18 and electrode 12 toward workpiece 10. Due to feedback through resistor 80, as represented at E in FIG. 2, the output at comparator 46 is maintained until the average gap voltage (in magnitude) drops below a level designated D. Thus, after forward motion of electrode 12 begins the gap 13 must close to drop the gap signal at 44 slightly below the level B. The turn-off condition for comparator 46 is designated by the vertical line 104. This lag due to the feedback through resistor 80 is primarily to eliminate noise effects that might otherwise bias comparator 46 below the turn-on condition 100. As long as the average gap voltage remains greater than level D after having exceeded the level B, motor 22 is pulsed continuously to close gap 13. For a given machining operation, the frequency of oscillator 76 is adjusted by means of resistor 77 to provide an ideal feed rate at which the average gap voltage at wiper 44 is just slightly greater than the reference signal at wiper 62 together with the feedback via resistor 80. For this condition, material is removed from workpiece 10 at a substantially optimum discharge gap and the electrode 12 moves continuously forward in increments at the fastest possible rate without stopping unless a short occurs at the gap. Once an operator determines the ideal feed rate for a given machining operation, the setting of resistor 77 and thus the feed rate are fixed as contrasted to a feed rate that is varied continuously and automatically in prior art devices.

It will be apparent that ideally electrode 12 moves in a continual series of discrete displacement increments or, stated differently, a continual stepping motion. Hence as used in this application in connection with characterizing the motion of electrode 12, the term "continuous" means that the series of displacement increments is uninterrupted, i.e., the stepping motion of electrode 12 is uninterrupted. Such motion is achieved so long as the gap voltage at wiper 44 is above the reference at comparator 46 set by wiper 62. Because electrode 12 moves in small precise increments, the feed rate of electrode 12 and hence the rate of material removal is optimized when the reference at comparator 46 is set to correspond to substantially the optimum gap A and the frequency of oscillator 76 is set so that the voltage at wiper 44 is normally maintained just slightly greater than the reference at comparator 46. Since ideally wiper 62 and oscillator 76 can be set so that the stepping motion is not interrupted, depending on the capabilities of the operator and on the particular machining operation the ideal condition can be approached so that interruption of the stepping motion is minimized and, unless a short occurs at the gap, the electrode will not reverse. Thus the dead band should be several increments wide, at least greater than one increment, so that the electrode does not step through the dead band and, unless a short occurs at the gap, the gap voltage at wiper 44 does not drop below the reference at comparator 48 set by wiper 56. The stepping increments should be small enough so that when the next pulse from oscillator 76 occurs, sufficient material has been machined from work 10 during the preceding step so that the gap voltage at wiper 44 exceeds the reference at comparator 46 and the forward stepping motion of electrode 12 is uninterrupted. Thus the machining gap can be maintained substantially at the optimum gap during a machining operation by keeping the gap voltage at wiper 44 just slightly greater than the reference at comparator 46 set by wiper 62.

If the feed rate is not ideal and if the signal at wiper 44 drops below the level D, the output of comparator 46 ceases and contacts 74 open to disconnect circuit 78 from oscillator 76 and stop electrode 12. However, due to continued machining at gap 13 while electrode 12 is stationary. The size of gap 13 increases until the signal at wiper 44 exceeds the reference signal at wiper 62 to re-initiate forward motion of the electrode.

Referring to the operation of the reverse channel, if the gap signal at wiper 44 should drop below the level of the reference signal from wiper 56, coil 84 is energized to close contacts 86 and connect the drive circuit 78 to oscillator 76. In response to the pulse train input at 88, circuit 78 steps motor 22 in the opposite direction to retract carriage 18 and electrode 12 in increments from the workpiece 10. Reverse travel of the electrode 12 continues until the size of gap 13 increases sufficiently for the signal at wiper 44 to exceed a level F corresponding to a turn-off condition 106 of comparator 48. The input level F is slightly larger in magnitude than the input level C due to feedback through inverter 90 and resistor 92 to stabilize the operation of the comparator 48. After reverse travel of electrode 12 is initiated and gap 13 increases, when the signal at 44 exceeds (increases negatively) the input level F the output at comparator 48 ceases, contacts 86 open and circuit 78 is disconnected from oscillator 76. Machining at gap 13 continues until the signal at wiper 44 exceeds the input level B to re-initiate forward travel of electrode 12.

In accordance with an important feature of the present invention, the difference between the input levels B and C provides a dead band designated at G. For input levels from wiper 44 within the dead band G no output will be present at either of the comparators 46, 48. In the absence of an output at either of the comparators 46, 48, drive circuit 78 is disconnected from oscillator 76 so that no relative motion occurs between electrode 12 and workpiece 10. During forward motion of electrode 12, if material is not being removed from the workpiece 10 fast enough to keep up with the rate at which the electrode is moving, the electrode is stopped. As gap 13 and the input at wiper 44 increase due to continued machining, the threshold for comparator 46 will soon be reached, almost instantaneously, and the electrode 12 again moves in the forward direction to continue machining at an optimum gap. Even if the operator has not set the ideal feed rate, electrode 12 may stop but it will not reverse unless a short occurs at gap 13 or unless the electrode is overdriven through the dead band as a result of a high feed rate greatly exceeding the ideal feed rate. Thus, the control operates essentially on a go-no go principle rather than a continuous proportional control as in prior art arrangements. The gap sensing circuit 34 has a time constant such that the pulsating discharge voltage at gap 13 is averaged without suppressing voltage variations at the gap caused by incremental motion of the electrode 12. Thus, the detected envelope at wiper 44 closely follows variations in the size of gap 13 so that high sensitivity at the dead band limits can be achieved by using high sensitivity comparators. On the other hand, each incremental displacement of electrode 12 is small relative to gap 13. By resolving the motion of electrode 12 into small increments and by operating at relatively high sensitivity, an extremely accurate control of the gap is achieved within the variations permitted by the dead band.

For purposes of illustration only, in one control apparatus constructed in accordance with the present invention, motor 22 operated at 200 steps per revolution and screw 24 had 24 threads per inch so that carriage drive was approximately 0.25 thousandths of an inch per step. The frequency of oscillator 76 was variable from 3–275 pulses per second and thus the feed rate of electrode 12 was 3–275 steps per second. The gap voltage before discharge was 150 volts and the dead band corresponding to the dead band G was ±1 volt referenced to the gap. Assuming an optimum gap of say 1.5 thousandths and a corresponding average gap voltage of 70 volts, the output at wiper 58 when referenced to gap 13 would correspond to 71 volts and the output at wiper 56 when referenced to gap 13 would correspond to .69 volts. Thus, the dead band variation would be on the order of ±1 or 2 percent. Generally, the width of the dead band G will be 2-5 displacement increments wide but the width will vary depending on the depth of the cut, the removal rate and the other parameters of the machining operation. It is to be understood, however, that the actual voltage levels which are applied to comparators 46, 48 are scaled down substantially to be compatible with comparators 46, 48 which are low level devices. For example, by means of wiper 44, the gap voltage may be scaled down to on the order of 5 volts and the difference between the forward reference signal at wiper 62 and the reverse reference signal at wiper 56 would be on the order of 100 millivolts. The feedback through resistors 80, 92 was on the order of 200 millivolts referenced to the 2 volt dead band.

Figure 3:
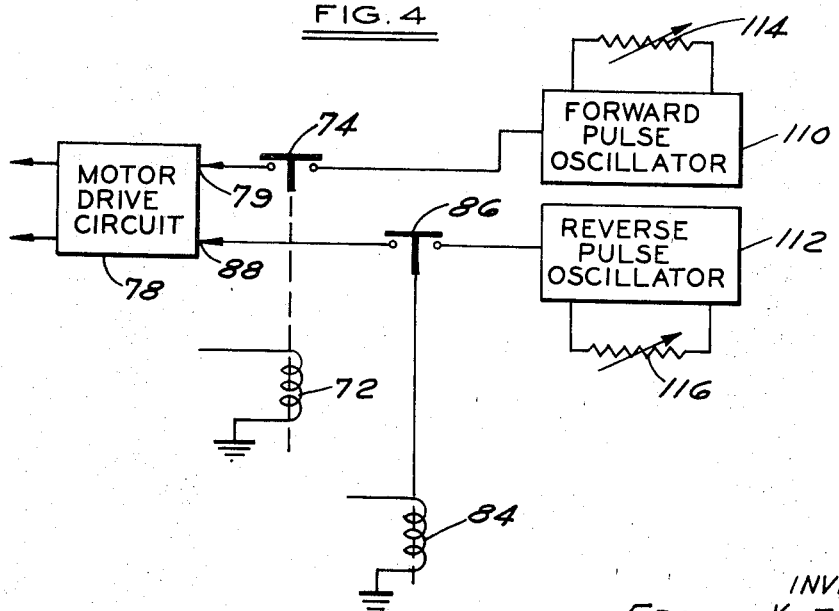
FIG. 3 illustrates a modification for the circuit shown in FIG. 1 to obtain different forward and reverse feed rates.

Referring to the modification illustrated in FIG. 3, a pair of pulse oscillators 110, 112 can be substituted for the single oscillator 76 (FIG. 1) to provide a high reverse feed rate that can be set independently of the forward feed rate. Oscillator 110 is arranged to be connected to the input 79 of the drive circuit 78 through contacts 74 to set the forward feed rate. Oscillator 112 is arranged to be connected to the input 88 through contacts 86 to set the reverse feed rate. Oscillators 110, 112 each have means illustrated as variable resistors 114, 116, respectively, to vary the repetition rate of the oscillators. Thus, oscillator 110 can be set for one feed rate, for example, 3–275 pulses per second and oscillator 112 can be set at a substantially higher rate, for example, twice the rate of oscillator 110 (0–500 pulses per second). Except for the substitution of oscillators 110, 112, the circuit of the control is identical to that described in conjunction with FIG. 1. With a chip in gap 13, a high reverse feed rate set by oscillator 112 causes rapid retraction of electrode 12 so that the chip can be easily removed from the gap by flushing the gap with dielectric fluid.

In the modification illustrated in FIG. 4, a gated oscillator 120 is substituted for oscillator 76 (FIG. 1) to provide quasi-proportional control of gap 13 while retaining, in part, the advantages of the step-motor 22 and the dead band G described in conjunction with FIG. 1. Components in FIG. 4 corresponding to components in FIG. 1 are designated by like reference numerals. Oscillator 120 is provided with suitable means such as a manual timing control 122 so that in one mode of operation the repetition rate of oscillator 120 can be set by the operator as with the circuit of FIG. 1. Additionally, the reptition rate of oscillator 120 is arranged to be varied automatically by a proportional control circuit 124 to provide a second mode of operation that varies the feed rate of electrode 12 in accordance with the average gap signal at wiper 44.

Circuit 124 comprises a differential amplifier 126 having a pair of inputs 128, 130. The input at 128 is connected to the wiper 44 of the gap sensing circuit 34 (FIGS. 1 and 4). The input at 130 is developed at a wiper 132 of a potentiometer 134 in a reference circuit 136. The reference circuit 136 is the same as the reference circuit 50 (FIG. 1) except that the third potentiometer 134 is connected in series with a fixed resistor 138 across the source 54. Wipers 56, 62, 132 are ganged together and the value of the resistor 138 is chosen so that the output at wiper 132 is halfway between the outputs at wipers 56, 62, that is resistor 138 is one half the value of resistor 60. Thus, the output at wiper 132 corresponds to the center (level A) of the dead band G (FIG. 2). The inputs at 128, 130 are arranged to be connected and disconnected by suitable means illustrated as a double pole switch 140.

Amplifier 126 develops a bipolar output which varies in magnitude and polarity in accordance with the difference between the inputs at 128, 130. The output of amplifier 126 is fed to a bipolar ramp generator 146 which develops a repetitive ramp function. The degree of slope of each ramp varies in accordance with the magnitude of the difference signal from amplifier 126 with either positive or negative slope depending on which of the inputs 128, 130 is greater. For purposes of illustration, a positive ramp is generated when the input at 128 from the gap sensing circuit 34 is greater than the input at 130 from the reference circuit 136. Thus, the slope of a positive ramp is proportional to the size of gap 13 when the gap exceeds the level B and the slope in a negative ramp is inversely proportional to the size of gap 13 when the gap is less than the level C.

The output of generator 146 is applied to a positive threshold detector 148 and to a negative threshold detector 150 which in turn are connected through a "OR" gate 152 to the gated oscillator 120. For positive going ramps, detector 148 develops gating pulses whose timing shifts in accordance with variations in the positive slope. Thus when the input at 128 is large relative to the input at 130, the threshold of detector 148 is exceeded early in the ramp cycle and the early timing of the gating pulse causes oscillator 120 to operate at a relatively high frequency. As the input at 128 decreases toward the input at 130, the threshold of detector 148 is exceeded later in the ramp cycle to delay the timing of the gating pulse which in turn decreases the frequency of oscillator 120. Similarly for negative going ramps, with a large difference between the inputs at 128, 130, the threshold of detector 150 is exceeded early in the ramp cycle and the timing of the gating pulse causes oscillator 120 to operate at a relatively high frequency and as the difference between the inputs at 128, 130 decreases, the timing of the gating pulse is delayed to decrease the frequency of oscillator 120.

In the operation of the circuit illustrated in FIG. 4, comparators 46, 48 provide a dead band control of motor 22 in the manner described in conjunction with the circuit shown in FIG. 1 so that motor 22 drives the electrode 12 in discrete displacement increments during a machining operation. However, with switch 140 closed for automatic control of the feed rate, the electrode 12 will be fed at a rate generally proportional to the average gap voltage developed at wiper 44. When the average gap voltage at wiper 44 is greater than the reference signal (level B) at wiper 62, comparator 46 provides an output which closes contacts 74 to connect oscillator 120 to the input 79. Amplifier 126 compares the input at 130 with the average gap signal from wiper 44 and provides a difference signal which is applied to the ramp generator 146. The difference signal from amplifier 126 varies directly in proportion to the size of the gap so that for a large gap the timing of the gating pulses from detector 148 increases the frequency of oscillator 120 to move electrode 12 rapidly toward the workpiece 10. As the gap 13 decreases, the difference signal also decreases, which in turn, reduces the frequency of oscillator 120 to slow down the electrode as the size of gap 13 approaches the optimum gap. Electrode 12 continues to move toward the workpiece 10 until the output of comparator 46 ceases in the manner described in conjunction with FIG. 1. So long as gap 13 is within the dead band G, variations of oscillator 120 caused by circuit 124 have no effect since oscillator 120 is disconnected and electrode 12 remains stationary.

Reverse operation is initiated when the average gap signal in wiper 44 drops below the reference signal from wiper 56 to energize coil 84 and close contacts 86 to connect oscillator 120 to the input 88 of the drive circuit 78. Amplifier 126 compares the reference signal from wiper 132 with the average gap signal from wiper 44 and the difference output varies in inverse proportion to the size of gap 13. When electrode 12 contacts workpiece 10 or when gap 13 is shorted by a chip, the difference signal is large so that generator 146 develops a steep ramp that causes early timing of the gating pulses from detector 150. The early timing in turn increases the frequency of oscillator 120 to rapidly move the electrode 12 away from the workpiece 10. As electrode 12 moves away from workpiece 10, the difference signal decreases and this in turn delays the timing of the gating of pulses from detector 150 to reduce the rate at which the electrode is retracted as the electrode approaches the dead band or until the chip is removed from the gap 13.

Although operating at a constant feed rate is preferred to obtain optimum material removal, that is operating with oscillator 76 (FIG. 1) at a constant frequency, it will be apparent that automatic operation by means of the embodiment illustrated in FIG. 4 retains the advantages, in part, of the dead band control (comparators 46, 48) and the incremental displacement of the electrode 12. With the automatic control illustrated in FIG. 4, the electrode may be driven into the dead band and thus the electrode may stop but is less likely to hunt about the optimum gap as compared to prior art continuous proportional controls. The control of FIG. 4 has certain advantages over the control of FIG. 1 for some machining operations, as for example, where the depth of cut varies during a given pass of the electrode 12 through the workpiece 10.

Although a particular reference signal circuit 50 and particular comparators 46, 48 have been described hereinabove for determining the dead band G, numerous modifications in the reference circuit 50 and the comparators 46, 48 will be apparent. Comparators 46, 48 may be two differential amplifiers whose threshold difference is set by a respective reference signal as in FIG. 1. Operational amplifiers can also be used for low drift and higher stability. A single reference signal may be provided and a threshold difference may be designed into the comparators by suitable biasing arrangements. Numerous arrangements for developing stable reference signals in place of potentiometers 52, 58 are contemplated. For example, resistor 60 may be omitted and wiper 62 can be displaced relative to wiper 56 with suitable tracking to achieve the reference signal difference. A completely solid state logic control is also contemplated by the present invention to eliminate mechanical relays (coils 72, 84 and contacts 74, 86). Also in the preferred embodiment, circuit 78 and motor 22 are constructed to lock motor 22 in the absence of an input from oscillator 76 when contacts 74, 86 are open. Various timing means other than the oscillators (76, FIG. 1; 110, 112, FIG. 3; and 120, FIG. 4) are also contemplated by the present invention to time the stepping of motor 22.

It is to be understood that the particular electrical discharge machining control has been described herein for purposes of illustration and is not intended to indicate the limits of the invention, the scope of which is defined by the following claims.

I claim:

1. In an electrical discharge machining apparatus wherein material is removed from a conductive workpiece by electrical discharge across a discharge gap defined between said workpiece and an electrode spaced from said workpiece, control means operable in response to an electrical condition at said discharge gap to cause substantially continuous relative motion between said electrode and said workpiece in a direction toward and into each other during a machining operation while maintaining variations in said discharge gap substantially between a maximum limit and a minimum limit, said control means comprising a source of electrical energy pulses, a stepping motor responsive to said pulses to cause said relative motion between said electrode and said workpiece and move said electrode progressively into said workpiece in discrete displacement increments during a machining operation, said motor being arranged and constructed such that each pulse causes a precise incremental rotation of said motor of substantially less than one revolution, gap sensing means responsive to said electrical condition at said discharge gap to provide an electrical signal which varies in response to displacement of said electrode relative to said workpiece, first comparison means including a first reference representing said maximum limit and responsive to said electrical signal to provide a first output signal when said discharge gap exceeds said maximum limit, second comparison means including a second reference representing said minimum limit responsive to said electrical signal to provide a second output when said discharge gap is less than said minimum limit, means for varying the pulse repetition rate of said pulse source, said stepping motor being responsive to variations in said repetition rate to vary the rate of relative motion between said electrode and said workpiece so that the repetition rate of said source can be selected to move said electrode relative to said workpiece at a predetermined feed rate at which said gap is just slightly greater than said maximum limit, and motor control circuit means to operatively couple said motor to said pulse source and selectively responsive to said first and said second output signals to cause relative motion of said electrode and said workpiece toward each other in response to said first output signal when said gap exceeds said maximum limit and to cause relative motion of said electrode and said workpiece in an opposite direction away from each other in response to said second signal when said gap is less than said minimum limit so that during a machining operation material is removed from said workpiece at a substantially optimum discharge gap and said electrode moves continuously into said workpiece in precise increments at a substantially maximized rate.

2. The apparatus set forth in claim 1 wherein said control means further comprises a direct current source, a first potentiometer and a second potentiometer connected to said direct current source, each potentiometer has a manually adjustable wiper arm to develop a respective reference signal, means to establish an output level at one wiper different from the output level at the other wiper, means coupling one of said wiper arms in said first comparison means to provide said first reference, and means coupling the other of said wiper arms in said second comparison means to provide said second reference.

3. The apparatus set forth in claim 1 wherein said first comparison means comprises a first differential amplifier having a pair of inputs, first reference signal means to provide said first reference, one of said inputs is connected to said gap sensing means and the other of said inputs is connected to said first reference signal means so that said first amplifier develops said first output signal when said electrical signal exceeds said first reference, and wherein said second comparison means comprises a second differential amplifier having a pair of inputs, second reference signal means to provide said second reference, one of said second amplifier inputs is connected to said gap sensing means and the other of said second amplifier inputs is connected to said second reference signal means so that said second amplifier develops said second output signal when said electrical signal is less than said second reference.

4. The apparatus set forth in claim 3 wherein said first differential amplifier has an output at which said first output signal is developed and first feedback means operatively connected between said first amplifier output and one of said first amplifier inputs to provide a difference between a turn-on condition and a turn-off condition of said first amplifier about said maximum limit, and wherein said second differential amplifier has an output at which said second output signal is developed and second feedback means operatively connected between said second amplifier output and one of said second amplifier inputs to provide a difference between a turn-on condition and a turn-off condition of said second amplifier about said minimum limit.

5. The apparatus set forth in claim 1 wherein said pulse source comprises first and second pulse source means to provide first and second trains of pulses, respectively, said second pulse train has a repetition rate greater than the repetition rate of said first pulse train, and wherein said motor control circuit means is responsive to said first output signal to operatively couple said first pulse source means to said motor and responsive to said second output signal to operatively couple said second pulse train source to said motor so that relative motion between said electrode and said workpiece in a direction away from each other is greater than said relative motion in a direction toward each other.

6. The apparatus set forth in claim 1 wherein said control means further comprises second means for varying the pulse repetition rate of said pulse source in accordance with the amount of deviation of said discharge gap from said maximum and minimum limits, said second repetition rate varying means comprises third reference means to provide a third reference representing a predetermined gap between said maximum and minimum limits, comparator means having first and second inputs, one of said comparator inputs is connected to said gap sensing means and the other comparator input is connected to said third reference means, said comparator means is responsive to said electrical signal and said third reference to provide an error signal proportional to the amount of deviation of said discharge gap from said predetermined gap, and means operatively coupled to said comparator means and said pulse source means and responsive to said error signal to vary said repetition rate in accordance with said error signal.

7. In an electrical discharge machining apparatus wherein material is removed from a conductive workpiece by electrical discharge across a discharge gap defined between said workpiece and an electrode spaced from said workpiece, control means operable in response to an electrical condition at said discharge gap to cause substantially continuous relative motion between said electrode and said workpiece in a direction toward and into each other during a machining operation while maintaining said gap at substantially a predetermined value at which said relative motion will occur substantially without stopping and, unless a short occurs at said gap, substantially without reversing, said control means comprising a source of electrical energy pulses, a stepping motor responsive to said pulses for causing relative motion between said electrode and said workpiece in discrete displacement increments and moving said electrode progressively into said workpiece in discrete displacement increments during a machining operation, said motor being arranged and constructed such that each pulse from said pulse source causes a precise incremental rotation of said motor of substantially less than one revolution, gap sensing means responsive to said electrical condition at said discharge gap to provide an electrical signal which varies in response to displacement of said electrode relative to said workpiece, comparison means responsive to said electrical signal to provide a first output signal when said gap is greater than said predetermined value and to provide a second output signal when said gap is less than said predetermined value, and circuit means for operatively connecting said stepping motor to said pulse source to actuate said motor in a direction to cause relative motion of said electrode and said workpiece toward and into each other in response to said first output signal and to actuate said motor in a direction to cause relative motion of said electrode and said workpiece away from each other in response to said second output signal and wherein said predetermined gap can vary from a maximum limit to a minimum limit during a machining operation and wherein said comparison means comprises first comparator meas, first reference means providing a first reference representing said maximum limit, second comparator means and second reference means providing a second reference representing said minimum limit, said first comparator means is responsive to said electrical signal and said first reference to provide said first output signal when said discharge gap exceeds said maximum limit, and said second comparator is responsive to said electrical signal and said second reference to provide said second output signal when said gap is less than said minimum limit whereby as long as said gap exceeds said maximum limit said electrode moves progressively and substantially continuously in a direction toward and into said workpiece.

8. The apparatus set forth in claim 7 wherein said pulse source has a variable pulse repetition rate and wherein said control means further comprises means to vary the repetition rate of said pulse source so that for a given machining operation said repetition rate is set to a predetermined repetition rate at which said discharge gap is normally maintained just slightly greater than said maximum limit.

9. In an electrical discharge machining apparatus wherein material is removed from a conductive workpiece by electrical discharge across a discharge gap defined between said workpiece and an electrode spaced from said workpiece, control means operable in response to an electrical condition at said discharge gap to cause substantially continuous relative motion between said electrode and said workpiece in a direction toward and into each other during a machining operation while maintaining said gap at substantially a predetermined gap that is substantially at a maximum gap limit but can vary between said maximum gap limit and a minimum gap limit, said predetermined gap being one at which material removal occurs at a substantially maximized rate, said control means comprising a source of electrical energy pulses having a variable pulse repetition rate, drive means including a stepping motor responsive to said pulses for causing relative motion between said electrode and said workpiece in discrete displacement increments and moving said electrode progressively into said workpiece in discrete displacement increments during a machining operation, said drive means being arranged and constructed such that a single pulse from said pulse source causes a precise incremental rotation of said motor and a corresponding displacement of said electrode relative to said workpiece that is less than the difference between said maximum gap limit and said minimum gap limit, gap sensing means responsive to said electrical condition at said discharge gap to provide an electrical signal which varies in response to displacement of said electrode relative to said workpiece, comparison means responsive to said electrical signal to provide a first output signal when said electrical signal is greater than a first control limit representing said maximum gap limit and to provide a second output signal when said electrical signal is less than a second control limit representing said minimum limit, means to vary the repetition rate of said pulse source so that for a given machining operation said repetition rate can be set to a predetermined repetition rate at which said electrical signal is normally maintained just slightly greater than said first control limit, and circuit means for operatively connecting said stepping motor to said pulse source to actuate said motor in a direction to cause relative motion of said electrode and said workpiece toward and into each other in response to said first output signal and to actuate said motor in a direction to cause relative motion of said electrode and said workpiece away from each other in response to said second output signal so that as long as said electrical signal exceeds said first control limit said electrode moves progressively and substantially continuously in a direction toward and into said workpiece.

10. In the method of removing material from a conductive workpiece by an electrical discharge across a gap defined between said workpiece and an electrode spaced from said workpiece wherein said electrode is moved relative to said workpiece in a direction toward and progressively into said workpiece during a machining operation and wherein said electrode is maintained relative to said workpiece during a machining operation at substantially a predetermined gap that is substantially at a maximum gap limit but can vary between said maximum gap limit and a minimum gap limit, the steps of establishing a first control reference representing said maximum gap limit, establishing a second control reference representing said minimum gap limit, sensing variations in an electrical condition at said gap while causing relative incremental motion between said workpiece and said electrode in a first direction toward each other in discrete displacement increments and at a predetermined rate that normally maintains said sensed electrical condition just slightly greater than said first control reference, said limits having a separation therebetween that is greater than at least one displacement increment, comparing said sensed electrical condition with said first control reference and with said second control reference, interrupting said relative incremental motion in said first direction when said sensed electrical condition is less than said first control reference, and moving said electrode relative to said workpiece in an opposite direction away from said workpiece in discrete displacement increments when said sensed electrical condition is less than said second control reference whereby material can be removed at a substantially optimum rate by substantially minimizing interruption of said relative incremental motion in said first direction and, unless a short occurs at said gap, by substantially eliminating relative incremental motion in said opposite direction.

11. The apparatus set forth in claim 1 wherein said stepping motor and said pulse source are arranged and constructed so that at least more than one pulse is required to move said electrode from said maximum limit to said minimum limit.

References Cited
UNITED STATES PATENTS

| | | | |
|---|---|---|---|
| 1,061,612 | 5/1913 | Heroult | 13—13 |
| 2,761,050 | 8/1956 | Ballhausen. | |
| 3,370,147 | 2/1968 | Matulaitis. | |
| 2,939,065 | 5/1960 | Matulaitis. | |

RALPH F. STAUBLY, Primary Examiner

U.S. Cl. X.R.

13—13; 314—65; 318—18